US012453984B2

(12) United States Patent
Haraldsted Hickmott et al.

(10) Patent No.: US 12,453,984 B2
(45) Date of Patent: Oct. 28, 2025

(54) DISPENSING DEVICE FOR INDUSTRIAL ROBOTS

(71) Applicant: AIM ROBOTICS APS, Søborg (DK)

(72) Inventors: Mie Haraldsted Hickmott, Kongens Lyngby (DK); Karlis Akis, Kongens Lyngby (DK)

(73) Assignee: AIM ROBOTICS APS, Søborg (DK)

( * ) Notice: Subject to any disclaimer, the term of this patent is extended or adjusted under 35 U.S.C. 154(b) by 207 days.

(21) Appl. No.: 18/255,850

(22) PCT Filed: Dec. 6, 2021

(86) PCT No.: PCT/EP2021/084411
§ 371 (c)(1),
(2) Date: Jun. 2, 2023

(87) PCT Pub. No.: WO2022/117890
PCT Pub. Date: Jun. 9, 2022

(65) Prior Publication Data
US 2024/0033775 A1 Feb. 1, 2024

(30) Foreign Application Priority Data
Dec. 4, 2020 (EP) .................................... 20211899

(51) Int. Cl.
*B05C 17/01* (2006.01)
*B05C 5/02* (2006.01)

(52) U.S. Cl.
CPC ........ *B05C 17/0133* (2013.01); *B05C 5/0216* (2013.01); *B05C 17/0103* (2013.01)

(58) Field of Classification Search
CPC .............. B05C 17/0133; B05C 5/0216; B05C 17/0103
See application file for complete search history.

(56) References Cited

U.S. PATENT DOCUMENTS 5,165,961 A * 11/1992 Freeman ............. B05C 11/1015 118/DIG. 2
5,348,585 A 9/1994 Weston
(Continued)

FOREIGN PATENT DOCUMENTS

DE 10335146 A1 3/2005
DE 102009027783 A1 1/2011
SE 510258 C2 * 5/1999 ......... B05C 17/0103

OTHER PUBLICATIONS

Machine translation of SE-510258-C2.*
International Search Report and Written Opinion of the ISA for PCT/EP2021/084411 mailed Apr. 20, 2022, 14 pages.

*Primary Examiner* — Jeremy Carroll
(74) *Attorney, Agent, or Firm* — Nixon & Vanderhye P.C.

(57) ABSTRACT

A dispensing system (1) for industrial robots comprising a base (19) comprising a first end (21) and a second end (23), where the first end comprises a connecting arrangement for a syringe, a connection bracket in connection to the base plate, configured to attach the base to an articulated robot arm (3), a stepping motor (59) that is connected to the second end of the base plate, where the stepping motor comprises a central rotor (61) having a first rotational axis and at least two electromagnets arranged as a stator (63) around the central rotor, a plunger rod (49) having a first longitudinal axis and a second rotational axis and where the plunger rod is in connection to the central rotor, where a rotational movement of the central rotor maneuvers the plunger rod in a direction parallel to the rotational axis of the plunger rod, wherein the plunger rod further comprises a rotational lock, where the rotational lock is in connection to the base plate ensuring that the plunger rod is rotationally static during the rotational movement of the central rotor.

12 Claims, 7 Drawing Sheets

(56) References Cited

U.S. PATENT DOCUMENTS

| | | | | |
|---|---|---|---|---|
| 2004/0245293 | A1* | 12/2004 | Lor | B05C 17/0133 222/390 |
| 2016/0263615 | A1* | 9/2016 | Tanaka | B05C 5/0225 |

* cited by examiner

DISPENSING DEVICE FOR INDUSTRIAL ROBOTS

CROSS-REFERENCE TO RELATED APPLICATIONS

This application is the U.S. national phase of International Application No. PCT/EP2021/084411 filed Dec. 6, 2021, which designated the U.S. and claims priority to EP 20211899.8 filed Dec. 4, 2020, the entire contents of each of which are hereby incorporated by reference.

TECHNICAL FIELD

A dispensing system for industrial robots comprising a base comprising a first end and a second end, where the first end comprises a connecting arrangement for a syringe, a connection bracket in connection to the base plate, configured to attach the base to an articulated robot arm.

BACKGROUND

Industrial robots are being used at a higher rate in the present time than at any time before in human history, where the precision and repeatability of the work done by robots can be applied in a plurality of technical fields which may reduce the cost of production, by e.g. reducing the number of failures or mistakes that may be made by humans.

The increase in the number of industrial robots that are being used in different industrial applications also means that the industrial robot industry is a booming industry, where manufacturers are capable of delivering a vast number of industrial robots that have different purposes, different applications, different sizes and different costs. Some manufacturers provide robots that are specifically designed for a single purpose or task, while others provide multi-use robots that may be programmed for a plurality of purposes or to perform a plurality of tasks.

This means that the cost of acquiring an industrial robot has been drastically reduced, as the size and the scale of the tasks which robots undertake may be reduced drastically, so that a small manufacturing companies can invest in industrial robots that can assist in tasks that may be tedious for humans, or that require a high degree of precision, or to reduce the labor cost of manufacturing a specific product.

Currently there are a number of tasks that still are performed in industry by hand, such as the application of fluids from syringes, applications of liquid glue, sealants and other applications where a liquid has to be applied onto a surface in a precise manner, where the liquid has to be applied in a precise pattern and in a precise amount.

Currently, the most prevalent method of applying a precise amount of liquid is done where a syringe having the liquid to be dispensed is attached to an industrial robot, where a pneumatic pump is used to apply a pneumatic pressure to the piston of the syringe in order to control the dispensing of the liquid while the robot is positioning the tip of the syringe into the correct positions. However, it has been shown that it is difficult to control the rate of the dispensing of the liquid using pneumatic pressure as variations in ambient temperature, elevation, viscosity of the liquid to be dispensed etc. can influence the dispensing rate and precision from the syringe. Thus, there is a need to improve the dispensing system of industrial robots in order to provide more precise and reliable dispensing units.

DESCRIPTION

In accordance with the invention there is provided a dispensing system for industrial robots comprising a base comprising a first end and a second end, where the first end comprises a connecting arrangement for a syringe, a connection bracket in connection to the base plate, configured to attach the base to an articulated robot arm, a stepping motor that is connected to the second end of the base plate, where the stepping motor comprises a central rotor having a first rotational axis and at least two electromagnets arranged as a stator around the central rotor, a plunger rod having a first longitudinal axis and a second rotational axis and where the plunger rod is in connection to the central rotor, where a rotational movement of the central rotor maneuvers the plunger rod in a direction parallel to the rotational axis of the plunger rod, wherein the plunger rod further comprises a rotational lock, where the rotational lock is in connection to the base plate ensuring that the plunger rod is rotationally static during the rotational movement of the central rotor.

The central rotor may be powered by the electromagnets to rotate around its central axis, where the rotational movement of the central rotor may be relative to the electromagnets, base and/or other elements of the dispensing system that are not designed to rotate. The rotation of the central rotor may be translated into a longitudinal movement of the plunger rod, where a rotation of the central rotor in a first rotational direction may cause the plunger rod to maneuver in a first longitudinal direction (e.g. in a distal direction) and where a rotation of the central rotor in a second rotational direction may cause the plunger rod to maneuver in a second longitudinal direction (e.g. a proximal direction), where the first direction may be opposite to the second direction. Thus, the rotation of the central rotor may be translated into longitudinal movement of the plunger rod.

The plunger rod may be maneuvered relative to the base, where the plunger rod may be utilized to provide pressure and/or a force to a piston of a syringe, where the syringe may be provided with a liquid content, where the liquid content is intended to be pressed out of the proximal end of the syringe. The plunger rod may be inserted into a distal end of the syringe, where the plunger rod comes into contact with a piston inside the syringe barrel, where the piston separates the liquid content from the plunger rod, and acts as a piston rod to increase the pressure or reduce the volume of the part of the syringe that holds the liquid.

Thus, the movement of the plunger rod may be utilized to control the dispensing of the liquid from the syringe, where the liquid may be in the form of a glue, a polymer, sealant or other types of liquids that are dispensed via a syringe. The rotational movement of the central rotor may be directly proportional to the longitudinal movement of the plunger rod. Thus, if the central rotor rotates one revolution, the plunger rod will be maneuvered a predetermined length. If the central rotor is rotated a number of times, the plunger rod will be maneuvered a corresponding distance in the longitudinal direction.

The plunger rod may be maneuvered in a longitudinal distance relative to the dispensing system, where the base, electric motor, attachment bracket etc. may be seen as stationary, while the plunger rod may be maneuvered to apply a pressure/force to the piston of the syringe.

As the rotor of the electrical motor is in the form of a central rotor, where the rotor is adapted to rotate along a rotational axis, it may be important to maintain the rotational position of the plunger rod during the rotational movement of the central rotor. The plunger rod may be provided with a rotational locking mechanism where the rotational mechanism may be in the form of one or more mechanical connections that may connect the plunger rod to the base, allowing the static force of the base to be translated to a part of the plunger rod in order to maintain a static rotational position of the plunger rod while the central rotor moves.

One example of this may be that the system comprises a housing having a guide track and/or a rail, where a first locking part of the plunger rod is guided inside the rail, where the rail operates as a corresponding second locking part. The first locking part may have a physical form which is positioned inside the rail or guide track, ensuring that the first locking part cannot rotate relative to the rail and/or the guide track. Thus, when the central rotor rotates, the plunger rod is prevented from rotating via the rotational lock, where the rotational lock is mechanically connected to the base, and thereby provides a static counterforce to the plunger rod.

By providing a dispensing system in accordance with the present invention, it is possible to attach the dispensing system to an industrial robot, especially an articulated industrial robot, where the dispensing system is not affected by ambient temperatures, air pressures or other environmental factors when the dispensing system is to be operated. The direct mechanical connection between the central rotor and the piston may be controlled in a simple and reliable manner, where rotational movement of the central rotor may be translated into a mechanical movement of the piston of a syringe, when a syringe is used to apply a liquid to a surface via an industrial robot. The industrial robot may move the tip of the syringe into position and where a force is applied to dispense the liquid, the tip of the syringe may be maneuvered in a predefined pattern so that the liquid is applied in correct magnitude and correct pattern in accordance with the instructions given to the industrial robot.

In one exemplary embodiment, the plunger rod may have an outer surface that may comprise an outer thread, and where the central rotor may have a central opening having an inner surface that has an inner thread, where the inner thread cooperates with the outer thread. Thus, the plunger rod and the central rotor have a direct interaction, where the outer thread of the plunger rod may have a thread having a predefined thread count pr. length unit (threads/cm). The central rotor may have a matching thread or matching protrusions so that the rotational movement of the central rotor may be translated to the plunger rod. Thus, the rotational movement of the central rotor may be translated into a longitudinal movement of the plunger rod. The thread count may mean that for each rotational movement of the central rotor the plunger rod will move a predefined distance in a longitudinal direction. If the thread count is 10 threads pr. cm, then one rotation of the central rotor will move the plunger rod 1 mm. Thus, the movement of the plunger rod is directly proportional to the rotational movement of the central rotor.

In one exemplary embodiment, the inner surface of the central rotor may be moulded in relationship to the outer surface of the plunger rod. In order to provide the central rotor with a precise inner surface that matches the outer surface as well as possible, the inner surface of the central rotor may be moulded to the outer surface of the plunger rod. Thus, the inner surface of the central rotor may have a substantially identical match for the outer surface of the plunger rod. This may mean that there is little to no interaction/engagement between the outer surface and the inner surface, and that any margin of error in the translation of the rotational movement to longitudinal movement may be minimized.

In one embodiment, the central rotor may be in the form of an outer collar, which may be maneuvered magnetically via the electromagnetic coils, where the central rotor may further comprise an inner collar, where an outer surface of the inner collar is connected to an inner surface of the outer collar, and the inner surface of the inner collar has a thread which is a mating thread to the outer surface of the plunger rod. The inner collar may be moulded to the outer collar, where the inner collar may e.g. be of a polymeric material that is thermally moulded or chemically moulded to the outer surface of the plunger rod. Thus, the outer collar may be a generic outer collar, where the inner collar is moulded specifically to each plunger rod, ensuring that any deviation in machining of the plunger rod may be negated due to the fact that the inner collar matches the plunger rod due to the moulding process.

In one exemplary embodiment, the rotational lock may comprise a first member connected to the plunger rod and a second member connected to the base plate, where the second member prevents the first member from rotating, and the first member prevents the plunger rod from rotating. The first member may be in the form of a housing having a guide track and/or a rail, where a first locking part of the plunger rod is guided inside the rail, where the rail operates as a corresponding second locking part. The first locking part may have a physical form which is positioned inside the rail or guide track, ensuring that the first locking part cannot rotate relative to the rail and/or the guide track. Thus, when the central rotor rotates, the plunger rod is prevented from rotating via the rotational lock, where the rotational lock is mechanically connected to the base, and is thereby providing a static counterforce to the plunger rod.

The housing may be connected to the base directly or indirectly, and may e.g. have a central guide which has e.g. a rectangular cross sectional shape, where the central guide has a longitudinal length that is at least as long as the plunger rod, allowing the plunger rod to be accommodated in a central part of the central guide. The plunger rod may have a second locking part having a cross sectional shape that matches the cross sectional shape of the central guide, so that the second locking part is prevented from rotating relative to the central guide, and is thereby prevented from rotating relative to the base plate. The second locking part may have a cross sectional size that is smaller than the cross sectional size of the rectangular shape of the central guide, so that the second locking part may move in a longitudinal direction relative to the central part of the central guide. The second locking part may be rotationally static relative to the plunger rod, so that when the second locking part is prevented from rotating, the plunger rod is also prevented from being rotated. Thus, when the central rotor rotates around its rotational axis, and the longitudinal axis of the plunger rod extends along the rotational axis of the central rotor, the rotational movement of the central rotor is not translated into rotational movement of the plunger rod, but is only translated into longitudinal movement of the plunger rod.

In one exemplary embodiment, the cross-sectional shape of the central guide may be differing from circular. In this way, it is achieved that the shape of the central guide prevents the second locking part from rotating.

In one exemplary embodiment, the connecting arrangement may comprise an inner flange having an outer surface configured to provide a liquid tight seal between the inner flange and an inner surface of the syringe. The inner flange may have a shape that matches the distal end of a syringe and/or the opening of the syringe barrel allowing the distal end of the syringe barrel to be mounted onto the inner flange. The inner flange may be provided with an O-ring, which extends along the outer circumference of the inner flange, where the O-ring provides a liquid tight seal between the inner surface of the syringe barrel and the outer surface of the inner flange. The inner flange may be connected to the base.

In one exemplary embodiment, the innerflange may be removably connected with the base. The inner flange may have a size that matches a predefined size of a syringe, where one inner flange matches a syringe having a predefined size. Thus, if a different size second syringe is to be utilized along with the dispensing system, the inner flange may be removed and a second inner flange, which matches the size of the second syringe, may be mounted onto the base. Thus, the inner flange will provide a liquid tight seal to the syringe.

The inner flange may also be utilized to center the syringe when positioning the syringe on the dispensing system. It may be important to position the syringe correctly relative to the plunger rod, so that the plunger rod extends into a central axis of the syringe, allowing the force to be applied to a central area of the piston, or allowing the force to be applied equally to all sides of the piston, as the piston controls the precise dispensing of the liquid from the syringe. Any tilting of the piston may cause an imprecise amount of liquid to be dispensed pr. rotation of the central rotor.

The plunger rod may extend through a central axis of the inner flange, where the central axis of the inner flange may be equidistal from the outer surface of the inner flange in all directions.

The plunger rod may extend through a central axis of the central rotor, where the central axis of the central rotor may be in the mathematical center of the outer surface of the central rotor. Thus, the rotation of the central rotor may be balanced and the mass rotation of the central rotor may be symmetrical along the central axis. The rotational axis of the central rotor may be coaxial with the central axis of the central rotor.

In one exemplary embodiment, a proximal end of the plunger rod may comprise a plunger member, where a first end of the plunger member may be configured to cooperate with a piston of the syringe and a second end of the plunger member may be in connection to the plunger rod. The second end of the plunger member may be specifically designed to come into contact with the piston member of the syringe, where the plunger member may have a physical form that ensures that the force applied via the plunger rod is spread equally onto the piston member, ensuring that the piston member is depressed in a correct manner inside the syringe.

In one exemplary embodiment, the plunger member has an outer radial surface, where the outer radial surface may have an outer diameter that may be smaller than the inner diameter of the barrel of the syringe. By providing the plunger member having a size that is smaller than the inner diameter of the barrel it may be possible to use the barrel of the syringe to center the plunger member and/or the plunger rod inside the syringe. When the plunger rod extends a distance from the base, there is a risk that the plunger rod may move in a radial direction away from the longitudinal rotational axis of the central rotor. However, by providing a plunger member on the end of the rod, the barrel will prevent the plunger member from moving in a radial direction and thereby maintaining the plunger member and/or the plunger rod in its position during the dispensing operation.

In one exemplary embodiment, the plunger member may be removably connected with the plunger rod. The plunger member may have a size that matches a predefined size of a syringe, where one plunger member matches a syringe having a predefined size. Thus, if a different size second syringe is to be utilized along with the dispensing system, the plunger member may be removed and a second plunger member, which matches the size of the second syringe may be mounted onto the plunger rod.

In one exemplary embodiment, the connection arrangement comprises a first syringe grip and a second syringe grip, where the first and/or the second syringe grips may comprise a grip surface facing the first end of the base, configured to grip a barrel flange of a syringe between the grip surface and the base. The syringe grips may define a region where a syringe may be mounted onto the base, where the grips may be used to fix the syringe relative to the base. A syringe often comes with two syringe flanges, which are positioned on opposite sides of the syringe barrel on the distal end of the syringe barrel. The grips may be formed in such a manner that the two syringe flanges may be positioned between the syringe flanges in a rotational direction, and where a rotation of the syringe relative to the base may move the syringe flanges into position so that the syringe flanges enter the grip surface between the base and the grip. Thus, the grip may be used to mechanically fix the syringe relative to the base.

The grips may be positioned in a radial direction outwards from the inner flange, should an inner flange be mounted to the base, allowing the inner flange to be inserted into the syringe barrel and subsequently the syringe flanges may be rotated into the syringe grips.

In one exemplary embodiment, the distance between the grip surface and the first end may be adjustable, so that different thicknesses of barrel flanges may be gripped. The distance between the grip surface and the first end of the base may e.g. be equal to or slightly less than the thickness of the syringe flange, ensuring that friction or mechanical force will hold the syringe in position. When a different type of syringe is used together with the dispensing system, the distance between the grip surface and the first end of the base may be adjusted to the size of the second syringe. The adjustment may be reversable, allowing the distance to be adjusted continuously based on what type of syringe is being utilized for the dispensing system.

In one exemplary embodiment, the longitudinal axis and/or the second rotational axis of the plunger rod may be coaxial with the first rotational axis of the central rotor. This means that that the plunger rod extends through a central opening of the central rotor, ensuring that the rotational force applied to the central rotor via the electromagnetic coils is applied to the plunger rod. The relationship between the plunger rod and the central rotor may be similar to a nut and bolt relationship, where the nut rotates symmetrically around the bolt. The same may be applied to the central rotor and the plunger rod, where the central rotor rotates symmetrically around the plunger rod, and the plunger rod moves in a longitudinal direction along a longitudinal axis where the longitudinal axis is coaxial with the central rotor, irrespective in what rotational position the central rotor is positioned.

In one exemplary embodiment, the rotational movement of the central rotor may be proportional to the movement of the central rod. This means that the rotational movement of the central rotor may be directly proportional to the longitudinal movement of the plunger rod. Thus, if the central rotor rotates one revolution, the plunger rod will be maneuvered a predetermined length. If the central rotor is rotated a number of times, the plunger rod will be maneuvered a corresponding distance in the longitudinal direction.

In one exemplary embodiment, the central rotor may have a threaded inner surface that has a longitudinal length along the longitudinal axis that is more than 1 cm, or more preferably more than 2 cm, or more preferably more than 3 cm, or more preferably more than 4 cm, or more preferably more than 5 cm. By providing a threaded inner surface of the central rotor that is more than 1 cm, and between 2 and 4 cm long, it is possible to increase the precision of the contact between the central rod and the central rotor. This may thereby reduce the possibility of the threaded surfaces skipping a thread during rotation of the central rotor and the movement of the central rod in a direction along the longitudinal axis.

In one exemplary embodiment, the central rotor may be made of a material that is different from the material of the central rod. The central rotor may be made out of a bronze material. The central rod may be made out of steel, iron, stainless steel, aluminum or any suitable metal compound. Thus, it may be possible to reduce corrosion between two interacting threaded surfaces, such as the outer surface of the central rod and the inner surface of the central rotor.

BRIEF DESCRIPTION OF THE DRAWINGS

The following is an explanation of exemplary embodiments with reference to the drawings, in which.

DETAILED DESCRIPTION

Figure 1:
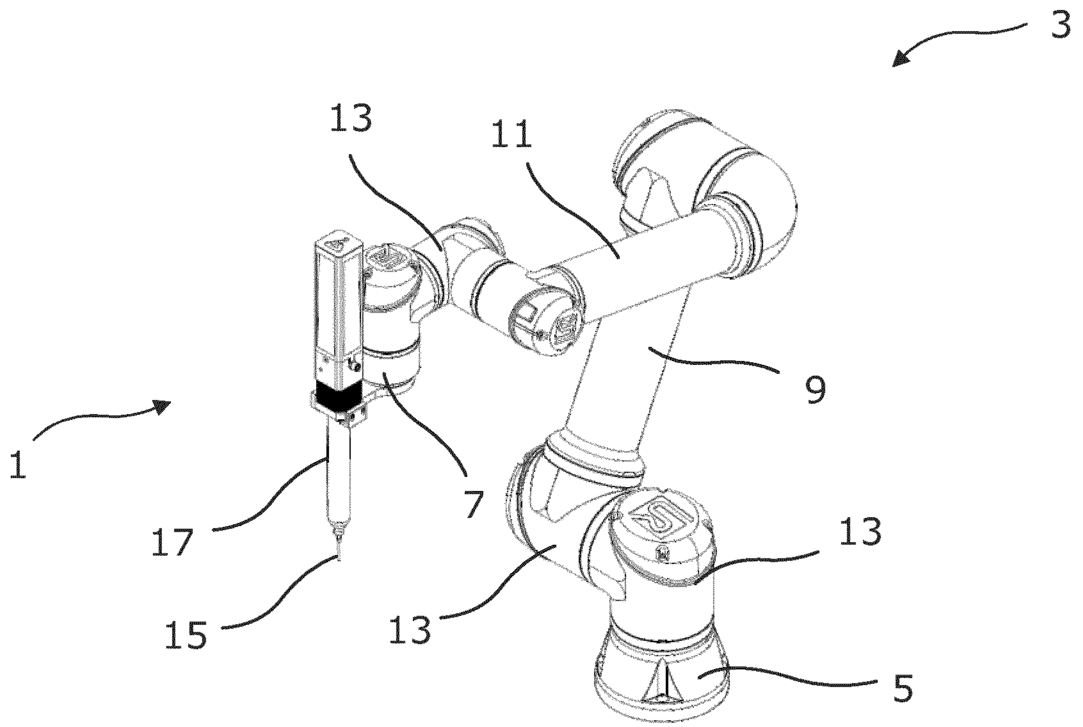
FIG. 1 shows a perspective view of an articulated robotic arm having a dispensing system.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated, or if not so explicitly described. The reference numbers seen may be applied to all of the figures of the present disclosure.

Figure 2:
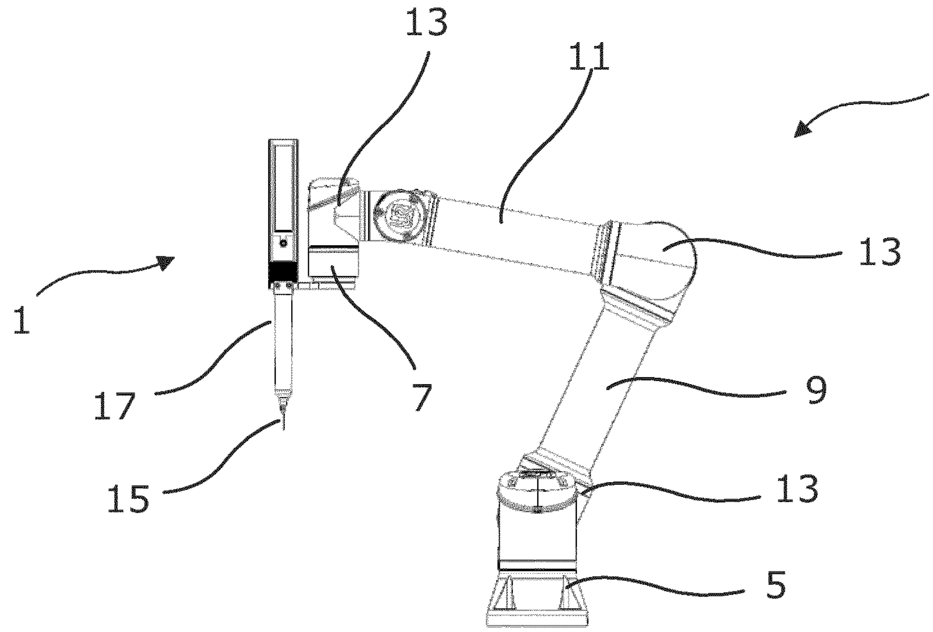
FIG. 2 shows the same, seen from the side.

FIGS. 1 and 2 show perspective views of an industrial articulated robotic arm 3, where a dispensing system 1 is attached to the free end 7 of the robotic arm 3. The robotic arm may be a multi axis robotic arm 3 having a base 5, a first arm 9, a second arm 11, and a plurality of articulations 13 between the base, the arms 9, 11 and the free end 7. Such a robotic arm 3 is capable of maneuvering the free end 7 in three dimensions into a plurality of positions, allowing the dispensing system 1 to be applied in a plurality of positions around the robotic arm 3. Thus, the tip 15 of the syringe 17 of the dispensing system 1 may be moved into a plurality of positions, upwards, downwards, sideways or otherwise in order to apply a liquid from the tip 15 of the syringe.

Figure 3:
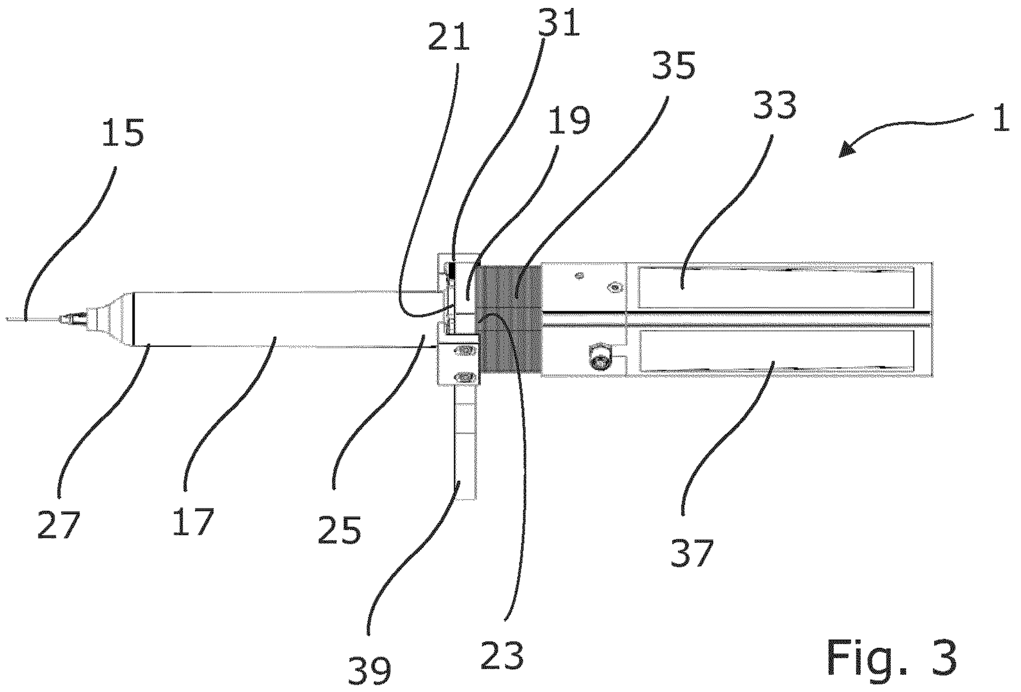
FIG. 3 shows a side view of the dispensing system in accordance with the invention.
Figure 4:
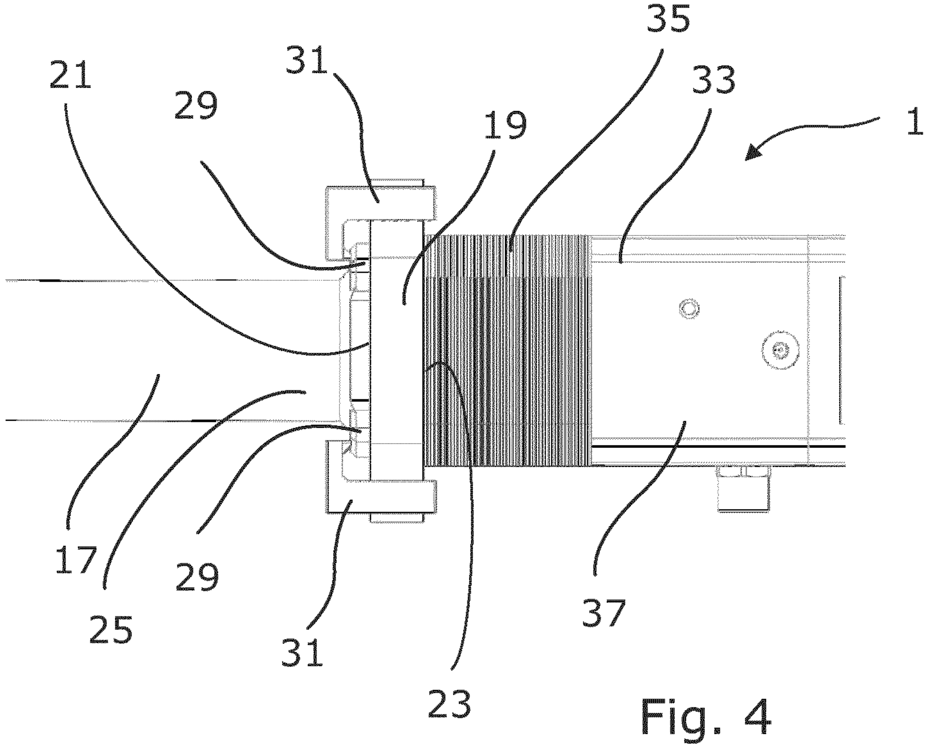
FIG. 4 shows a side view of the base of the dispensing system.

FIGS. 3 and 4 show the dispensing system 1, where the dispensing system comprises a base 19, having a first end 21 and a second end 23. The first end 23 is configured to receive a syringe 17, where a distal end 25 of the syringe is in connection with the first end 21 of the base 19. The syringe 17 comprises a liquid (shown in FIG. 5A-5C) which is adapted to be dispensed out of the tip 15 of the syringe 17 at the proximal end 27 of the syringe 17. The distal end 25 of the syringe 17 comprises syringe flanges 29 (shown in FIG. 4), which are gripped by two gripping parts 31 that are connected to the base 19, in order to fix the syringe 17 to the base 19. The second end 23 of the base 19 is connected to a housing 33, where the housing may be in the form of a motor housing 35 and a plunger housing 37 that are connected to the base. The plunger housing and the motor housing may be made in one part. The dispensing device 1 further comprises a connection bracket 39, which is configured to attach the base 19 to the industrial robot 3, seen in FIGS. 1 and 2.

Figure 5A:
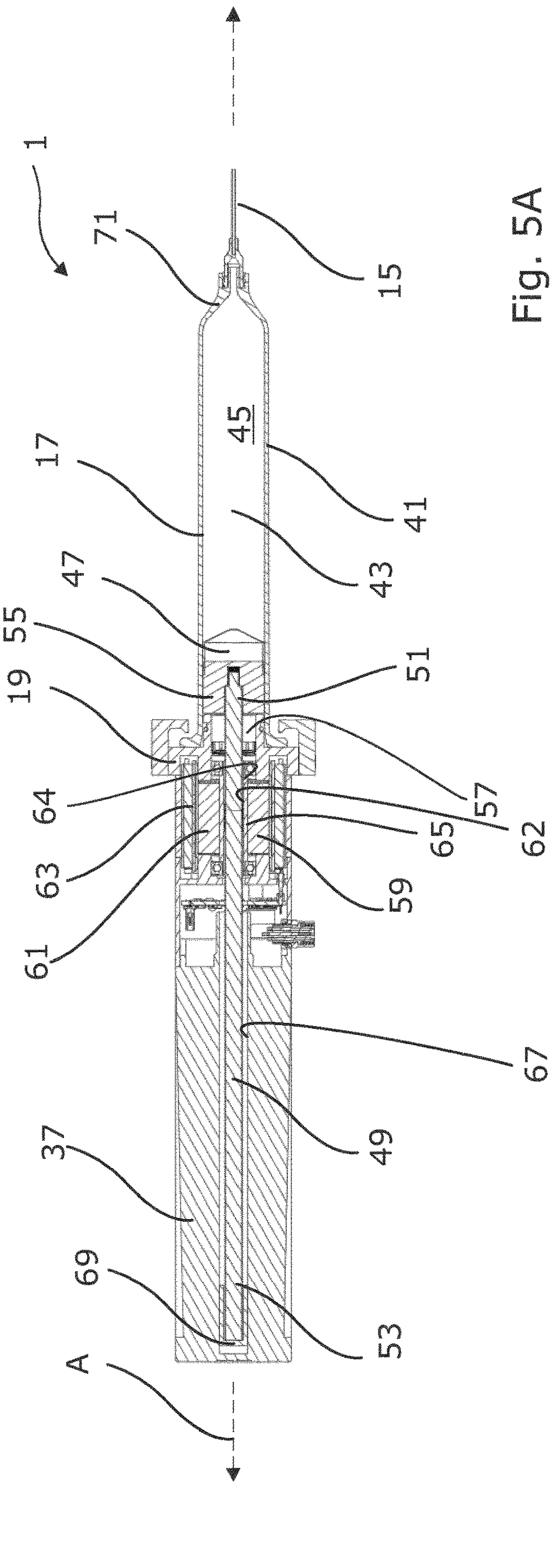
FIG. 5A-5C show cross sectional views of a dispensing system in different positions.

FIG. 5A shows a cross sectional view of the dispensing device 1, having a syringe 17 attached to the base 19, and where the syringe 17 comprises a syringe barrel 41, defining a volume 43 to hold a liquid 45, where distal part of the volume 43 is defined by a moveable piston 47, and the proximal part of the volume 43 is open to the environment via a dispensing tip 15, which is hollow and provides fluid communication from the environment into the volume 43, or vice versa.

The dispensing device 1 further comprises a plunger rod 49, having a longitudinal axis A, where the plunger rod 49 comprises a proximal end 51 and a distal end 53. The proximal end 51 is attached to a plunger 55 which abuts the piston 47 and is adapted to apply force to the piston 47. The plunger rod extends through an opening 57 in the base 19 so that a distal end 53 of the rod extends into the plunger housing 37, where the plunger housing is adapted to accommodate the distal end 53 of the plunger rod 49 when the plunger rod is in its fully retracted position, as is shown in FIG. 5A.

The dispensing device 1 further comprises an electrical motor 59, which may be a stepping motor, having a central rotor 61 and a stator 63, where the central rotor 61 has a rotational axis that is coaxial with the longitudinal axis A of the plunger rod 49. The plunger rod 49 extends through a central area 65 of the central rotor 61, where the central rotor 61 has an inner thread 62 while the plunger rod 49 may have an outer thread 64 which matches the inner thread 62 of the central rotor 61. Thus, any rotational movement of the central rotor 61 results in a longitudinal displacement of the plunger rod 49 along the longitudinal axis A, in order to reduce the size of the volume 43 of the syringe 17 to dispense a liquid inside the volume 43 out of the tip 15.

The housing 35, may be provided with a guide path 67, which extends coaxial to the longitudinal axis A, and is coaxial with the plunger rod 49 and/or the rotational axis of the central rotor 61. The distal end 53 of the rod 49 may comprise a first locking member 69, where the first locking member 69 may have an outer shape that matches the inner shape of the guide path 67, so that the rod 49 is prevented from rotating while the first locking member 69 is in contact with the guide path 67, so that the guide path operates as a second locking member. Thus, when the central rotor 61 rotates around its rotational axis, the plunger rod 49 remains static (rotationally) while being maneuvered in a longitudinal direction along the longitudinal axis A, and when moved in a proximal direction, the plunger 55 applies a force to the piston 47, where the force is transferred from the central rotor from a rotational movement via the threads into a longitudinal movement of the plunger rod 49.

Figure 5B:
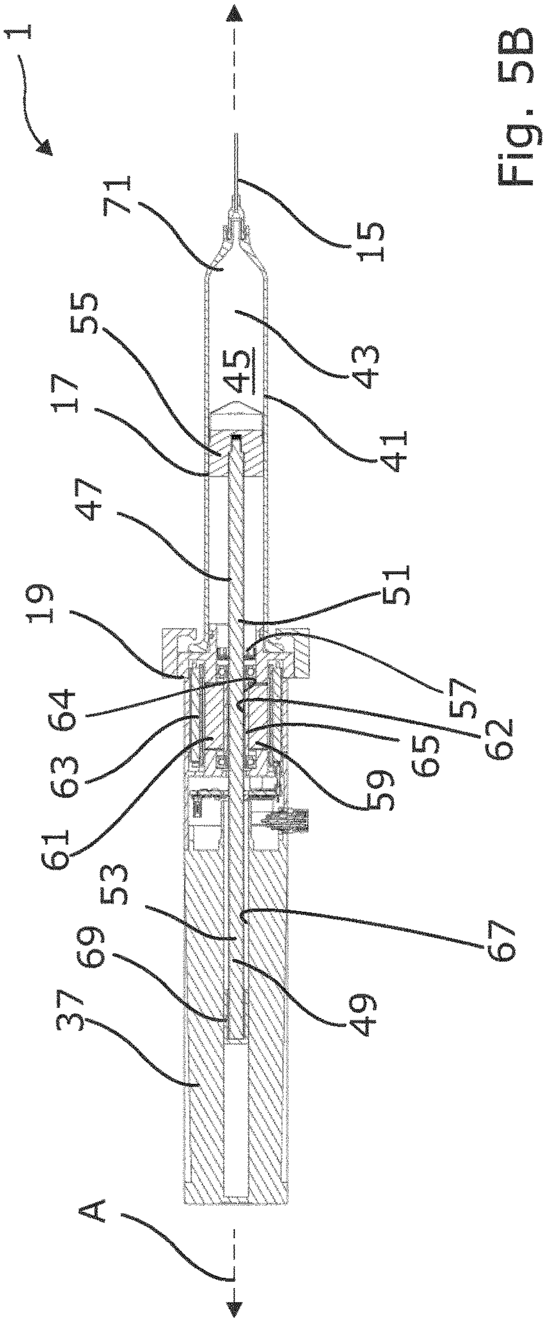

FIG. 5B shows the dispensing device in a second position, where the plunger rod 49 has been maneuvered a distance in the proximal direction, where the plunger 55 has pushed the piston in a proximal direction and is causing the reduction of the volume 43 allowing the liquid to be forced out of the tip 15.

Figure 5C:
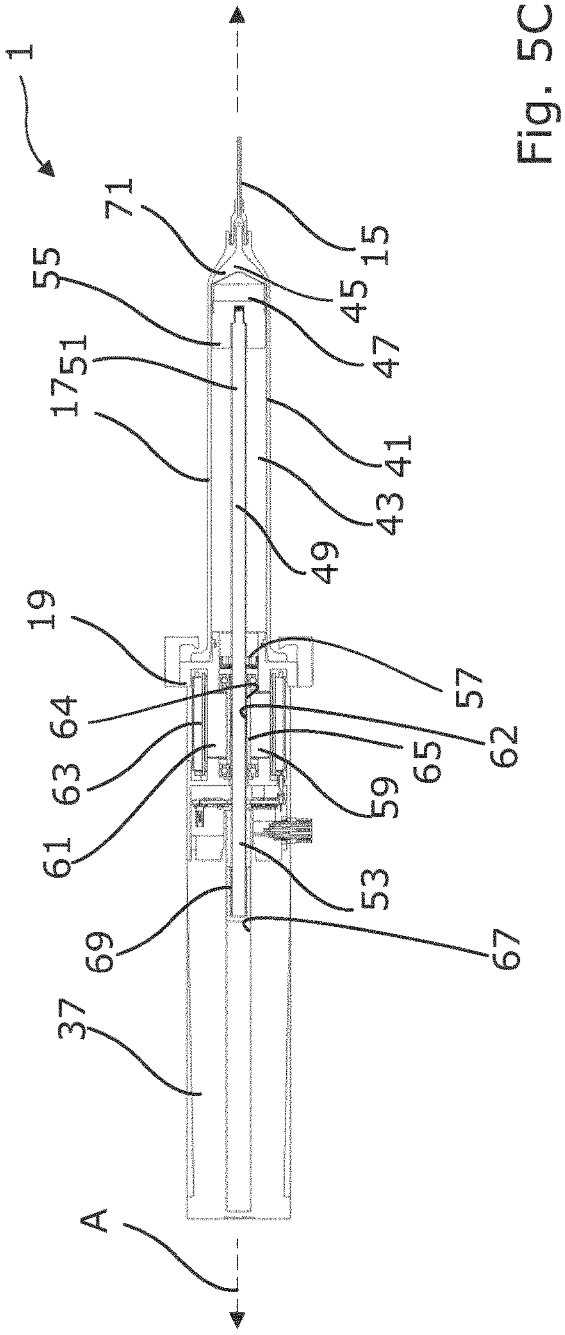

FIG. 5C shows the dispensing device 1 in a third position, where the plunger rod 49 has been maneuvered fully into an extreme proximal position, where the piston has reached the proximal end 71 of the syringe barrel, and where the piston 55 cannot move any further in the proximal direction.

Figure 6A:
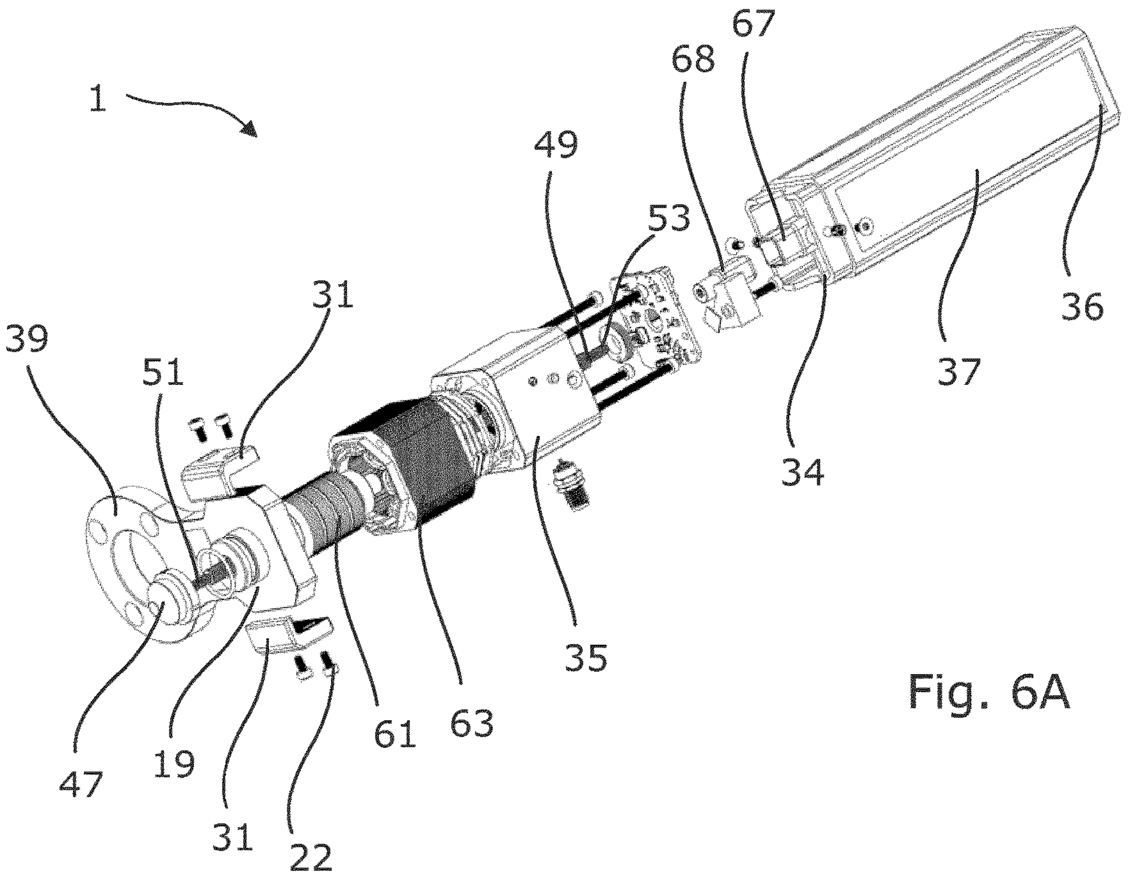
FIGS. 6A and 6B show, in perspective, an exploded view of an embodiment of the dispensing system and a sideview of an embodiment of the dispensing device, respectively.
Figure 6B:
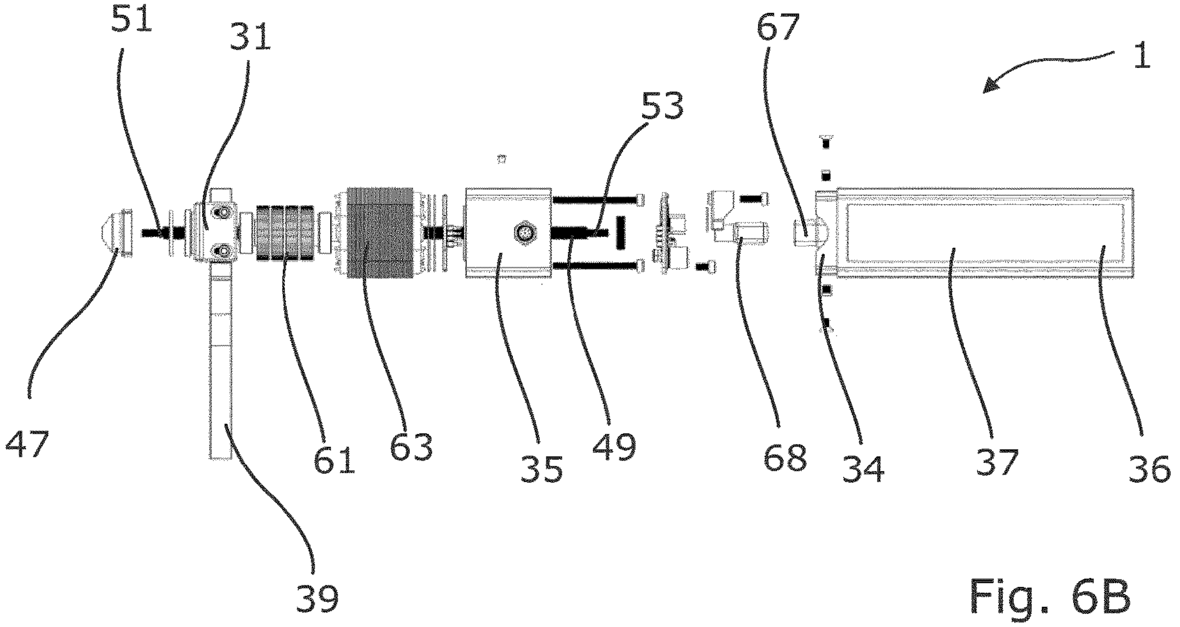

FIGS. 6A and 6B show an embodiment of the dispensing system where FIG. 6A shows an exploded perspective view of the embodiment and FIG. 6B shows an exploded side view of the same. The dispensing system in FIGS. 6-8 are shown without a syringe 17, but where the syringe 17 may be mounted on the base, similarly to what is shown in FIGS. 3-5. In FIGS. 6A and 6B the same reference numbers are used for the same parts as shown in FIGS. 4 and 5.

FIGS. 6A and 6B show the dispensing system 1, where the dispensing system comprises a base 19, where the base 19 is adapted to receive a syringe (not shown) where the syringe flanges 29 (not shown) are gripped by two gripping parts 31 that are configured to be connected to the base 19 via fastening members 22. The plunger housing 37 may comprise a first end 34 and a second end 36, where the first end 34 is configured to be attached to the base 19 or the motor housing 35, allowing the housing 37 to enclose the plunger. The plunger housing comprises a guide path 67, where the guide path has an internal surface shape which is adapted to match the outer surface shape of a first locking member 69, where the first locking member may be positioned inside the guide path 67 when the system 1 is fully assembled. The first locking member 69 may be attached to the distal end 53 of the rod 49 and may be configured to prevent the rod 49 from rotating, and thereby be rotationally static, while allowing the rod 49 and the first locking member to move in a longitudinal direction along the guide path 67. The proximal end 51 of the rod 49 is connected to a piston 47 where the longitudinal movement of the rod 49 results in a longitudinal movement of the piston 47, so that the rod 49 applies a force on the piston 47 and ensures that the piston can apply a force to the inner volume 43 of the syringe 17 (not shown).

The electrical motor 59 may have a central rotor 61 and a stator 63, where the rod 49 extends through a central area 65 (not shown) of the central rotor 61. The stator 63 is rotationally static and may be connected to the motor housing 35. The central rotor is configured to rotate along the central axis, and where the central rotor has an inner thread 62 (not shown) that matches an outer thread 64 (not shown) of the rod 49. Thus, when the central rotor 61 is rotated, the rotational movement of the rotor 61 is transformed into longitudinal movement of the rod 49 as the rod 49 is rotationally fixed using the first locking member 69 and the guide path 67 of the housing 33.

Figure 7A:
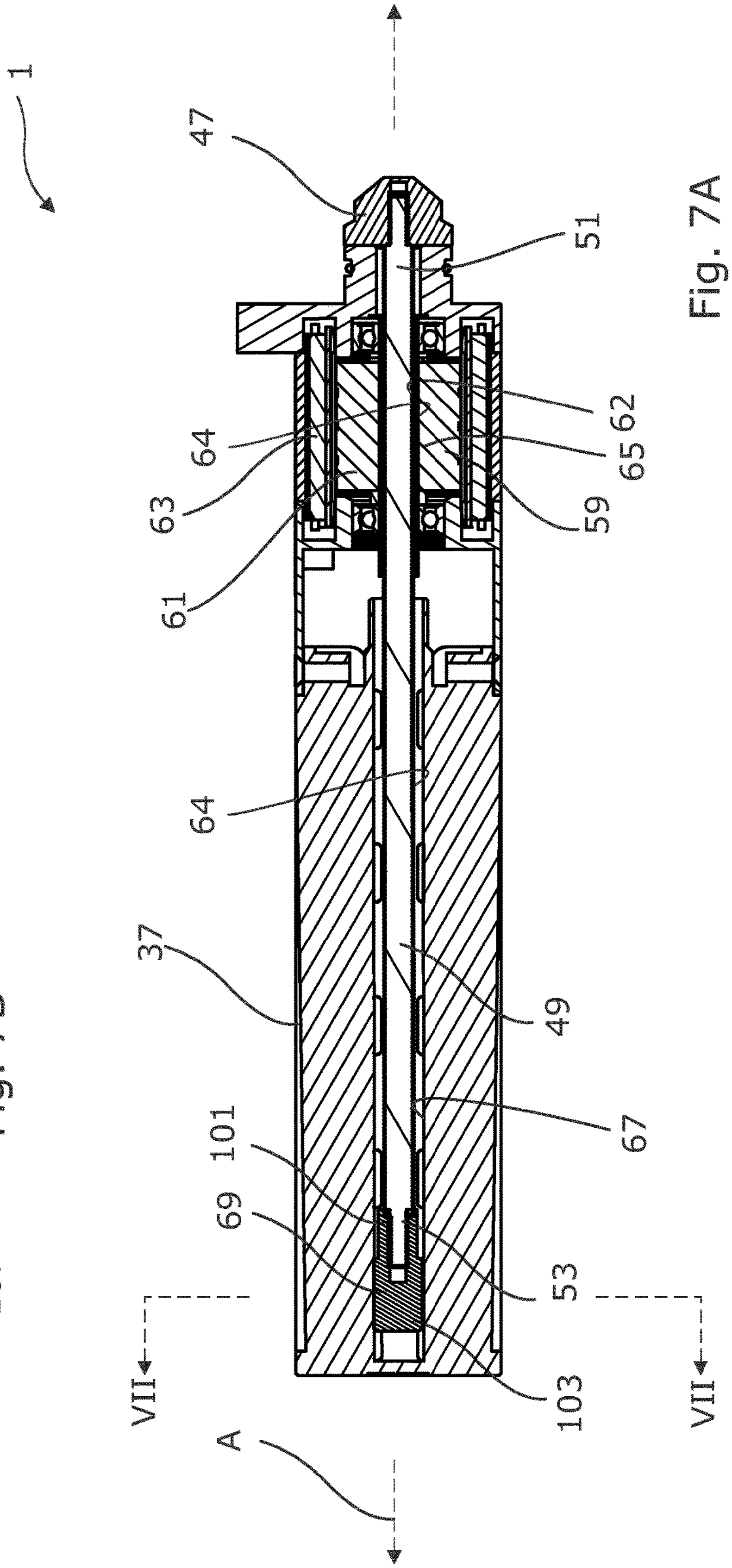
FIGS. 7A and 7B show a cross-sectional side view and a cross-sectional top view of an embodiment of the dispensing device, respectively.
Figure 7B:
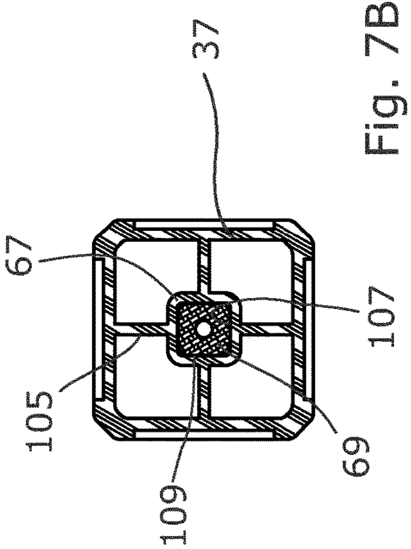

FIGS. 7A and 7B show a cross-sectional view of an embodiment of the dispensing system. FIG. 7A shows a cross-sectional side view of the dispensing system 1, similar to the embodiment shown in FIG. 5A, where the present disclosure shows how the locking member 69 is attached to the plunger rod 49. The first locking member 69 may have a proximal end 101 and a distal end 103, where the proximal end 101 is connected to the distal end 53 of the plunger rod 49. The proximal end 101 and the distal end 53 are connected in such a manner that the plunger rod 49 is rotationally fixed relative to the first locking member 69, so that the plunger rod 49 and the first locking member 69 are rotationally fixed relative to each other.

The plunger rod 49 and the first locking member 69 are slidably arranged inside a guide path 67 formed inside the plunger housing 37, so that the plunger rod 49 and the first locking member may slide in a direction towards the first end 34 of the housing 37, or alternatively in a direction towards the second end 36 of the housing 37. This allows the plunger rod 49 to extend into the syringe 17 (as shown in FIGS. 5A-5C) when the syringe 17 is attached to the dispensing device 1.

FIG. 7B shows a top cross-sectional view of the plunger housing, taken along axis VII-VII seen in FIG. 7A, where the plunger housing 37 comprises a guide path 67, where the guide path may be connected to the plunger housing 37 via one or more connecting members 105. The connecting members 105 may be in any shape or form, provided that the connecting members 105 fix the guide path member 67 relative to the plunger housing 37. The guide path member 67 may have an inner surface 107, which in this case is essentially rectangular, and where the locking member 69 has an outer surface 109 that matches the inner surface 107 of the guide path member 67. The matching inner surface 107 and the outer surface 109 ensures that the locking member 69 cannot rotate relative to the guide path member 67 and is therefore rotationally fixed relative to the guide path member 67. The plunger rod 47 may also be rotationally fixed relative to the first locking member 69, ensuring that the plunger rod 47 is rotationally fixed relative to the first locking member 69, the guide path member 67 and the plunger housing 37. Thus, when the central rotor 61 of the motor 59 rotates relative to the stator 63, the inner thread 62 of the central rotor 61 engages the outer thread 64 of the plunger rod 47 and maneuvers the plunger rod 47 in a longitudinal direction A (as shown in FIG. 5A-5C).

Figure 8B:
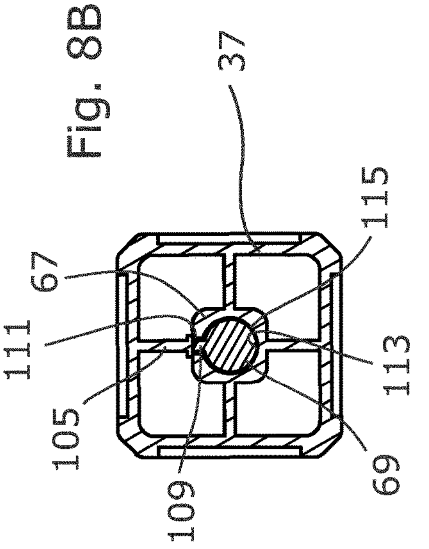
FIGS. 8A and 8B show an a cross-sectional side view and cross-sectional top view of an embodiment of the central rod having a key and slot system.
Figure 8A:
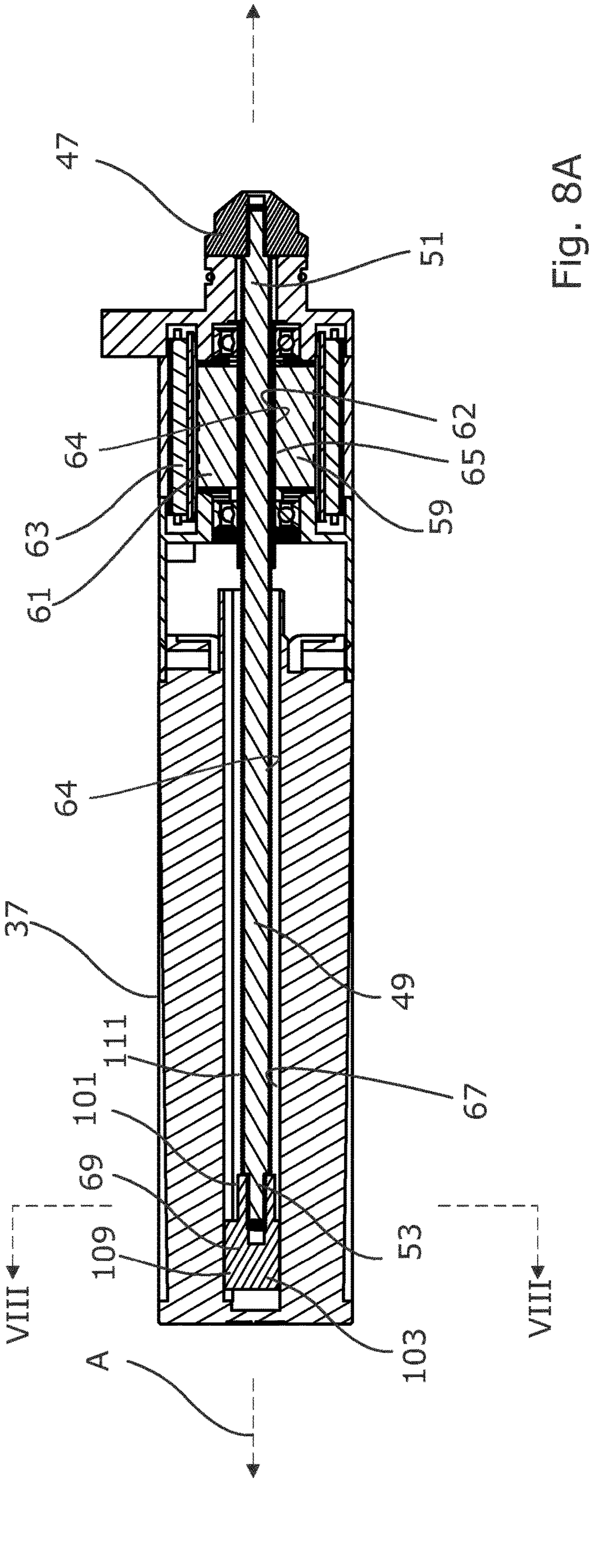

FIG. 8A-8B show an embodiment of the first locking member 69 having a projection 109 extending along the longitudinal axis A, where the guide path member 67 has a matching slot 111 extending along the longitudinal axis A. This embodiment of the dispensing device may be similar to that shown in the previous embodiments, with the exception of the guide path member 67 and the first locking device 69. The guide path member 67 and the first locking device 69 may be formed as a key and slot system, where the projection 109 may be seen as the key, and the slot 111 is the matching slot. As seen in FIG. 8B, taken along axis VIII-VIII, the guide path member 67 may have an inner surface 113 that has a circular inner shape, where the projection slot interrupts the circular inner surface in a radial direction away from the central axis A. The first locking member 49 may have a circular outer shape 115 that matches the circular inner surface 113 of the guide path member 67, and where outer surface of the projection 109 matches the inner surface of the slot 111. This allows the key (projection) 109 to move in a direction along the longitudinal axis A in the slot extending the full length of the guide path member 67 in a direction along the longitudinal axis A. The projection 109 matches a groove 111 in the housing and/or the guide path. In this way, it is achieved that the plunger rod 49 does not rotate when a rotational force is applied via the central rotor 59. As understood by the present disclosure, an alternative embodiment of the dispensing system 1 may be provided in form of a groove on the plunger rod and/or the locking device 69 and a matching projection from the housing 37 or the guide path that engages the groove, i.e. where the first locking device 69 has a groove and the guide path member has a projection, to prevent rotation, while allowing longitudinal movement of the plunger rod 49.

Within the understanding of the present disclosure, the person skilled in the art would not have to provide a locking device and/or a guide path, where it may be understood that the functioning of the locking device may be part of the plunger, and the functioning of the guide path may be part of the plunger housing, ensuring that the plunger rod is rotationally fixed relative to the housing.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A dispensing system for industrial robots comprising:

a base comprising a first end and a second end, where the first end comprises a connecting arrangement for a syringe, a connection bracket in connection to the base, configured to attach the base to an articulated robot arm, a stepping motor that is connected to the second end of the base plate, where the stepping motor comprises a central rotor having a first rotational axis and at least two electromagnets arranged as a stator around the central rotor, a plunger rod having a first longitudinal axis and a second rotational axis and where the plunger rod is in connection to the central rotor, where a rotational movement of the central rotor maneuvers the plunger rod in a direction parallel to the rotational axis of the plunger rod, wherein the plunger rod further comprises a rotational lock, where the rotational lock is in connection to the base ensuring that the plunger rod is rotationally static during the rotational movement of the central rotor, and wherein a proximal end of the plunger rod comprises a plunger member, where a first end of the plunger member is configured to cooperate with a piston of the syringe and a second end of the plunger member is in connection to the plunger rod.

2. A dispensing system for industrial robots according to claim 1, wherein the plunger rod has an outer surface that comprises an outer thread, and where the central rotor may have a central opening having an inner surface that has an inner thread, where the inner thread cooperates with the outer thread.

3. A dispensing system for industrial robots according to claim 2, wherein the inner surface of the central rotor is moulded in relationship to the outer surface of the plunger rod.

4. A dispensing system for industrial robots according to claim 1, wherein the rotational lock comprises a first member connected to the plunger rod and a second member connected to the base where the second member prevents the first member from rotating, and the first member prevents the plunger rod from rotating.

5. A dispensing system for industrial robots according to claim 1, wherein the connecting arrangement comprises an inner flange having an outer surface configured to provide a liquid tight seal between the inner flange and an inner surface of the syringe.

6. A dispensing system for industrial robots according to claim 5, wherein the inner flange is removably connected with the base.

7. A dispensing system for industrial robots according to claim 1, wherein the plunger member has an outer radial surface, where the outer radial surface has an outer diameter that is smaller than the inner diameter of the barrel of the syringe.

8. A dispensing system for industrial robots according to claim 1, wherein the plunger member is removably connected with the plunger rod.

9. A dispensing system for industrial robots according to claim 1, wherein the connection arrangement comprises a first syringe grip and a second syringe grip, where the first and/or the second syringe grip/s comprise a grip surface facing the first end of the base, configured to grip a barrel flange of a syringe between the grip surface and the base.

10. A dispensing system for industrial robots according to claim 9, wherein the distance between the grip surface and the first end is adjustable, so that different thicknesses of barrel flanges may be gripped.

11. A dispensing system for industrial robots according to claim 1, wherein the longitudinal axis and/or the second rotational axis of the plunger is coaxial with the first rotational axis of the central rotor.

12. A dispensing system for industrial robots according to claim 1, wherein the rotational movement of the central rotor is proportional to the movement of the central rod.

* * * * *